United States Patent [19]

Mueller et al.

[11] 4,211,832
[45] Jul. 8, 1980

[54] LITHIUM-HALOGEN CELL INCLUDING MONOMER CHARGE TRANSFER COMPLEX

[75] Inventors: Max A. Mueller; Curtis F. Holmes, both of E. Amherst, N.Y.

[73] Assignee: Wilson Greatbatch Ltd., Clarence, N.Y.

[21] Appl. No.: 967,236

[22] Filed: Dec. 7, 1978

[51] Int. Cl.$^2$ .................... H01M 4/36; H01M 6/18
[52] U.S. Cl. .................................. 429/105; 429/213; 429/192
[58] Field of Search ............... 429/213, 191, 192, 199, 429/101, 218, 105, 212

[56] References Cited

U.S. PATENT DOCUMENTS

| | | | |
|---|---|---|---|
| 3,660,163 | 5/1972 | Moser | 429/213 X |
| 3,817,791 | 6/1974 | Greatbatch et al. | 429/101 |
| 3,957,533 | 5/1976 | Mead et al. | 429/213 |

Primary Examiner—Anthony Skapars
Attorney, Agent, or Firm—Christel, Bean & Linihan

[57] ABSTRACT

A lithium halogen cell comprising a lithium anode, a solid electrolyte comprising lithium halide and a cathode comprising a charge transfer complex of a monomer and a halogen. The monomer is an aromatic tertiary amine which forms a complex with the halogen, and one monomer found to be satisfactory is pyrrole.

10 Claims, 4 Drawing Figures

LITHIUM-HALOGEN CELL INCLUDING MONOMER CHARGE TRANSFER COMPLEX

BACKGROUND OF THE INVENTION

This invention relates to the conversion of chemical energy to electrical energy, and more particularly to a new and improved solid electrolyte primary cell having a lithium anode, a cathode including halogen and a lithium halogen electrolyte.

In recent times a solid electrolyte primary battery has been developed to provide relatively high voltage and high energy density in a battery which is especially useful for long life, low current drain applications. Of the alkali metals, lithium is generally recognized as the most satisfactory material for the negative electrode, i.e. the anode on discharge, in a non-aqueous cell. In selecting material for the positive electrode, i.e. cathode on discharge, it is appropriate to consider, among other factors, relative chemical activity, energy density and discharge characteristic during cell life.

SUMMARY OF THE INVENTION

It is, therefore, a principal object of this invention to provide a new and improved lithium-halogen cell.

It is a further object of this invention to provide such a cell comprising a lithium anode, a solid electrolyte comprising lithium halide and an improved halogen cathode.

It is a further object of this invention to provide such a cell having relatively high voltage and useful for long life, low current drain applications.

It is a further object of this invention to provide such a cell wherein the cathode is a charge transfer complex of a monomer and halogen.

It is a further object of this invention to provide such a cell which prevents any migration of halogen-containing cathode material which would otherwise create an electrical short circuit in the cell.

It is a further object of this invention to provide such a cell which is relatively easy and economical to manufacture.

The present invention provides an alkali-halogen cell in which a halogen is complexed with a monomer. In particular, the present invention provides a lithium halogen cell comprising a lithium anode, a solid electrolyte comprising lithium halide and a cathode comprising a charge transfer complex of halogen and a monomer. The monomer is an aromatic tertiary amine which forms a complex with the halogen, and one monomer found to perform satisfactorily is pyrrole.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENTS

Solid electrolyte primary cells have been developed including a lithium anode, a cathode comprising a charge transfer complex of an organic donor component and halogen, and a lithium-halogen electrolyte. An organic donor component material found to be particularly desirable is polyvinyl pyridine polymer. Such cells provide relatively high voltage and high energy density in a battery which is especially useful for long life, low current drain applications. In the further development of these cells, one area of investigation is new cathode compositions.

The cell of the present invention is an alkali-halogen cell in which a halogen forms a charge transfer complex with a monomer. The monomer is an aromatic tertiary amine which forms a complex with the halogen, and one monomer found to be satisfactory is pyrrole. A useful cell is obtained without the use of polymer charge transfer complex materials heretofore employed in lithium halogen cells.

Figure 1:
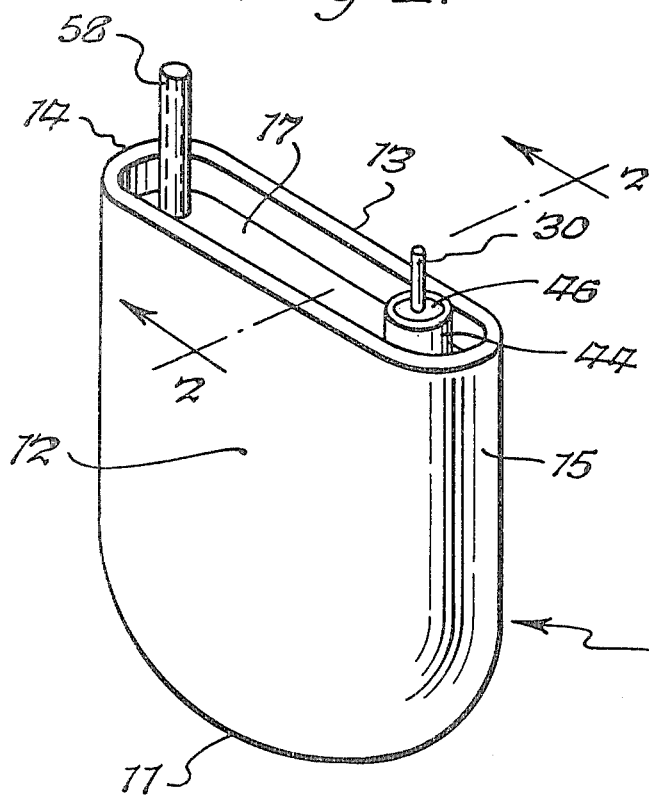
FIG. 1 is a perspective view of a lithium-halogen cell according to the present invention.

Referring now to FIG. 1, an alkali metal-halogen cell according to the present invention comprises a casing 10 of metal such as stainless steel which preferably is shaped or otherwise formed to be hollow and generally rectangular in shape and of an integral construction including a curved bottom portion 11, spaced-apart planar side wall portions 12, 13 extending from the bottom portion, and spaced-apart curved end wall portions 14, 15 also extending from bottom portion 11 and joining corresponding ones of the side wall portions 12, 13. The bottom portion 11 is of compound curvature in that it is curved both in a direction between the side wall portions 12, 13 and also is curved in a direction between the end wall portions 14, 15. This latter curvature of bottom portion 11 is of the same degree as the curvature of the end wall portions 14, 15 thereby defining a continuous, curved surface around along the casing. The side wall portions 12, 13 are generally parallel. The casing has an opened top or end opposite the bottom portion 11 which is sealed closed by means of a lid 17 also of metal such as stainless steel.

Figure 2:
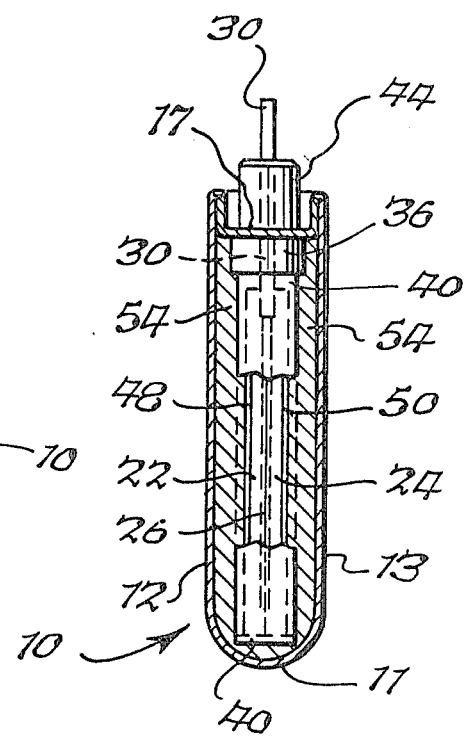
FIG. 2 is a sectional view taken about on line 2—2 of FIG. 1.
Figure 3:
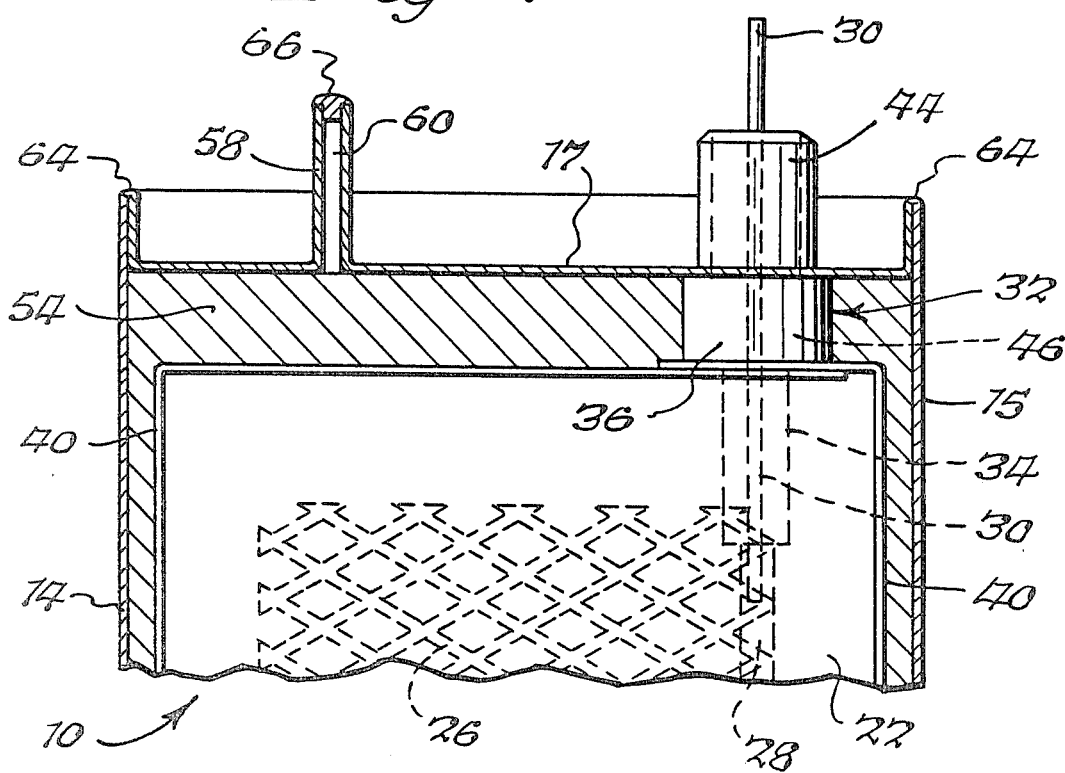
FIG. 3 is an enlarged fragmentary vertical sectional view of the cell of FIG. 1.

Referring now to FIGS. 2 and 3, the cell of the present invention further includes anode means comprising a pair of alkali metal elements or plates 22, 24 having an anode current collector element 26 sandwiched or positioned therebetween. According to a preferred mode of the present invention, anode elements 22, 24 are of lithium. As shown in detail in FIG. 3, current collector 26 is relatively thin, preferably a sheet of no. 12 mesh zirconium metal. A conductor strip 28 of nickel or suitable metal is spot welded to collector element 26 along one edge thereof, and an electrical conductor 30 which can be of nickel or other suitable metal is welded at one end to the strip 28 and is of sufficient length allowing it to extend out from the casing for making external electrical connection thereto. Conductor 30 is sealed from the remainder of the cell by means including an insulator element generally designated 32 which surrounds lead 30 and has a first portion 34 which is sandwiched between the anode plates 22, 24 and a second or body portion 36 which is cylindrical and located between the anode plates and lid 17 when the cell is completed. The insulator 32 is of a material which in addition to being a non-conductor of electricity also is non-reactive with halogens. One form of material found to perform satisfactorily is a fluoropolymer material commercially available under the name Halar, a trademark of the Allied Chemical Company. Of course, other materials having these characteristics can be used for the insulator 32.

The anode assembly comprising the alkali metal elements 22, 24 and current collector 26 is fitted within an anode holding means or frame in the form of a strap 40 which embraces the anode assembly in a manner exposing at least one metal surface. Strap 40 is of the aforementioned Halar material or any similar material which is non-reactive with halogens. In the present illustration, strap 40 surrounds the peripheral edges of the anode elements or plates 22, 24 in a snug, sealing relationship. The opposite ends of strap 40 are provided with apertures of a size sufficient to receive the insulator portion 34, and these ends are overlapped adjacent the insulator portion 34 as shown in FIG. 3. A ferrule 44 of metal such as stainless steel encloses a further portion of lead 30. Ferrule 44 is threaded at one end (not shown) and is connected into insulator portion 36, the inner surface of which also is threaded. Ferrule 44 is of generally hollow cylindrical shape, and the region between ferrule 44 and conductor 30 is filled by a glass seal 46 formed therein to provide a metal-glass hermetical seal.

One illustrative method of froming the anode assembly is as follows. First there is provided a subassembly including lead 30 within the combination of insulator 32 and ferrule 44. Strap 40 then is assembled into place with the ends overlapped to align the openings therein which then are fitted onto insulator portion 34. The overlapping ends joined to insulator portion 34 can be sealed in place with a suitable cement which is non-reactive with halogens such as a cyanoacrylate cement commercially available under the name Permabond 101. Similarly, the junction between insulator portion 36 and the bottom portion of ferrule 44 can be cemented. Current collector 26, conducting strip 28 and the end of lead 30 are spot welded together whereupon lithium plates 22, 24 are positioned within strap 40 on opposite sides of the collector element 26 and insulator portion 34. The subassembly then is placed within a suitable fixture or support and is pressed together with a suitable force, for example about 3,000 lbs. The current collector 26, strip 28, insulator portion 34 and the portion of lead 30 contained therein are sealed within the lithium elements 22, 24. The material of strap 40 is pressure bondable to lithium with the result that the peripheral juncture at the edges of the lithium elements 22, 24 is enclosed or sealed by the strap 40. If desired, the junction between the inner surface of strap 40 and the periphery of lithium elements 22, 24 can be sealed further by the aforementioned cement. The completed anode assembly thus has two exposed surfaces which are oppositely directed or disposed.

When the anode assembly is completed, the exposed surfaces of the alkali metal elements 22 and 24 can be provided with coatings 48 and 50, respectively, of an organic electron donor component material, and the nature of the coatings 48, 50 and their role in the cell of te present invention will be described in further detail presently. The completed anode assembly is positioned in casing 10 as shown in FIGS. 2 and 3, with the anode operative surfaces spaced from the inner surface of casing 10.

The cell of the present invention further comprises a cathode including a region of cathode material 54 within casing 10 and operatively contacting the exposed surfaces of the lithium elements 22, 24 and operatively contacting the inner surface of casing 10. Casing 10, being of electrically conducting material, serves as a cathode current collector. According to the present invention, the cathode material 54 comprises a charge transfer complex of a monomer and halogen. The monomer is an aromatic tertiary amine which forms a stable complex with the halogen. Examples of such monomers are picoline, pyridine, indole, pyrrole, and quinoline. By way of illustration, a quantity of pyrrole, which is a liquid, can be placed in casing 10 and the halogen then added to form the complex within casing 10. Alternatively, the halogen can be added to the pyrrole in a separate container or vessel to form the complex which then would be introduced to the interior of casing 10. The nature of cathode material 54 and manner of making the same will be described in further detail presently.

The cell of the present invention further comprises an element 58 on the casing and having a passage 60 therethrough which at one end thereof is in communication with the interior of casing 10 and which at the other end is externally exposed. In particular, element 58 is in the form of a metal tube fixed to lid member 17. Tube 58 preferably is a separate element which is fitted at one end into an aperture provided through lid 17 and welded thereto. Alternatively, the lid 17 and tube 58 could be formed integrally from a single piece of metal. Lid member 17 is fitted into place in the open end of the casing and is welded at 64 around the peripheral edge thereof to the corresponding edge of the casing. Filling element 58 provides a convenient way of introducing liquid to the interior of the casing and into operative relationship with the lithium anode for making the cathode material 54 within casing 10 after lid 17 has been welded in place 17. Then passage 60 is closed by suitable means, for example an element 66 which can be a plug of material which is non-reactive with halogens and which is sealed in place by suitable non-reactive cement. Also, sealing passage 60 can of course be accomplished by pinching or clamping the outer end of tube 58 and sealing it further by welding. The metal tube 58 preferably of stainless steel also serves as an electrical terminal inasmuch as the casing 10 serves as a cathode current collector.

The alkali metal-halogen cell according to the present invention operates in the following manner. As soon as the halogen-containing cathode material 54 operatively contacts an alkali metal anode element, a solid alkali metal-halogen electrolyte begins to form at the interface. In the cell illustrated in FIGS. 1-3, this occurs at the outer or oppositely disposed surfaces of the two anode elements 22 and 24. An electrical potential difference will exist between the anode lead 30 and the cathode terminal 58 because casing 10 is of electrically conductive material and operatively contacts the halogen-containing cathode material to serve as a cathode current collector. When anode elements 22, 24 are of lithium, the mechanism by which the foregoing is accomplished is believed to include migration of lithium ions through the electrolyte whereby lithium is the ionic species in the cell.

In the cell according to the present invention, it is important that the halogen-containing cathode material is not allowed to come in contact directly with any portion of the electrical conducting means connected to the elements of the anode, in particular anode current collector 26 and leads 28, 30 shown in FIGS. 1—3. Otherwise, this will cause an electronic conduction between the cathode material and the anode current collector 26 or leads 28, 30 creating an electrical short circuit condition in the cell. In particular, any migration of the halogen-containing cathode material directly to anode current collector 26 or directly to leads 28, 30 instead of first reacting with an element of the anode, i.e. one of the lithium elements, will result in a condition of electronic conduction thereby creating a short circuit in the cell. On the other hand, when the halogen-containing cathode material contacts only the lithium or other alkali metal portion of the anode this gives rise first to a condition of ionic conduction and results in proper cell operation.

In the cell of the present invention, all parts of the anode current collector 26 and leads 28, 30 are sealed from the cathode material and from the metal casing. anode current collector 26 and its connection through strip 28 to lead 30 are sealed within the sandwiched or pressure bonded assembly of lithium plates 22, 24. This seal is enhanced by the strap 40 which is of Halar or similar material which is non-reactive with halogens.

The foregoing arrangement together with the provision of insulator 32 and ferrule 44 with glass seal 46 provides an anode structure which is completely sealed with the exception of the oppositely-directed operative lithium surface portions of the anode which are available to the cathode material. All parts of anode current collector 26 and leads 28, 30 are shielded from the cathode material and from the cell casing. Furthermore, the sealed anode assembly can be completed before the entire cell is assembled for efficiency in manufacturing. The foregoing advantages are provided in a cell which is relatively simple in construction.

The coatings 48 and 50 which can be provided on lithium elements 22 and 24, respectively, can perform serveral important functions, one of which is a desirable reduction in cell impedance believed to result from a better and improved electrically effective contact area between the cathode material 54 and each lithium element. The coatings 48, 50 serve as protective coatings, permitting a relatively longer handling time during construction of the cell prior to introducing the cathode material. The material of coatings 48 and 50 on lithium elements 22 and 24, respectively, is an organic electron donor material of the group of organic compounds known as charge transfer complex donors. A preferred material for the coatings is polyvinyl pyridine and it is applied to the exposed surfaces of lithium elements 22 and 24 in the following manner. A solution of poly-2-vinyl pyridine polymer in anhydrous benzene or other suitable solvent is prepared. The poly-2-vinyl pyridine is readily commercially available. The solution is prepared with 2-vinyl-pyridine present in the range from about 10% to about 20% by weight with a strength of about 14% by weight of 2-vinyl-pyridine being preferred. While 2-vinyl pyridine, 4-vinyl pyridine and 3-ethyl 2-vinyl pyridine can be used, 2-vinyl pyridine is preferred because of its more fluid characteristics in solution. When the solution is prepared at a strength below about 10% the resulting coating can be undesirably too thin and when the solution is prepared at a strength greater than about 20% the material becomes difficult to apply. The solution is applied to the exposed surface of each lithium plate in a suitable manner, for example simply by application with a brush. The presence of the anhydrous benzene serves to exclude moisture thereby preventing any adverse reaction with the lithium plate. The coated anode then is exposed to a desiccant in a manner sufficient to remove the benzene from the coating. In particular the coated anode is placed in a chamber with barium oxide solid material for a time sufficient to remove the benzene, which can be in the neighborhood of 24 hours. The foregoing procedure can be repeated to provide multiple coatings or layers, for example three, on each lithium plate.

The cell of the present invention is illustrated further by the following examples.

EXAMPLE I

A quantity of 20 ml. (18.70 grams) of pyrrole, $C_4H_5N$, was added to 35.9 grams iodine in a beaker. The mole ratio was 0.5 mole $I_2$: 1.0 mole pyrrole. A fast exothermic reaction was observed to occur immediately with evolution of a foul, brown smoke. Impedance was measured by introducing to the beaker a molybedenum electrode connected to an impedance meter. The impedance of the reaction product was observed to drop from infinite impedance to about 5100 ohms. Most of the iodine did not dissolve, and after several hours two phases were observed: one being a gunky, iodine-rich phase and the other being a solution of iodine and pyrrole. Because of this observed low or slow solubility, it was decided to reverse the sequence of introducing the reactants.

EXAMPLE II

A quantity of 20 ml. of pyrrole was placed in a beaker with a Teflon stirrer. The molybdenum electrode of an impedance meter was attached to the beaker. Then, solid iodine was added in small, measured increments to the solution. Conductivity was measured as a function of iodine concentration, and the results are summarized in the following table:

Table I

| Iodine Dependence Of Iodine-Pyrrole Solution | |
|---|---|
| Weight Iodine In Grams | Impedance In Ohms |
| 0.2633 | 11946 |
| 1.3028 | 9740 |
| 2.7045 | 5500 |
| 4.8045 | 1860 |
| 7.6213 | 1180 |
| 10.0248 | 965 |

When impedance was measured at the iodine concentration of 2.7045 grams, the impedance first rose and then reached an equilibrium value. At the iodine concentration of 10.0248 grams, it was observed that all of the iodine did not go into solution.

Figure 4:
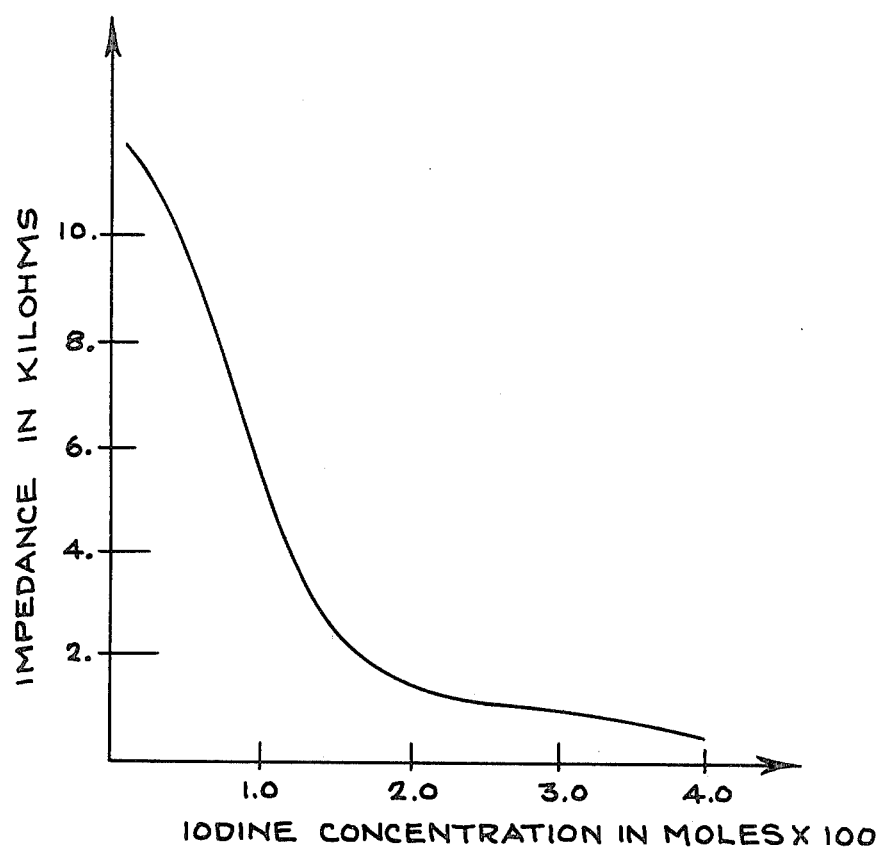
FIG. 4 is a plot of impedance vs. iodine concentration in an iodine-pyrrole complex.

The foregoing is illustrated in FIG. 4 which is a plot of impedance as a function of iodine concentration. The monotonically increasing behavior of conductance with respect to iodine concentration is indicative of the type of conduction exhibited by charge transfer complexes and thus indicates formation of a charge transfer complex of pyrrole and iodine.

EXAMPLE III

A piece of lithium (uncoated) having a weight of about one gram was placed in the beaker containing the charge transfer complex of iodine and pyrrole prepared according to Example II. The lithium element served as an anode and a strip of molybdenum also was placed in the beaker spaced from the lithium element, the molybdenum element serving as a cathode current collector. The open circuit voltage was measured immediately and observed to be 2.891 volts. The impedance also was measured and found to be 1071 ohms. Next a 100 kilohm load was placed across the electrodes and the voltage was measured at various time intervals as summarized in the following table:

Table II

| Elapsed time in minutes | Cell Voltage in volts |
|---|---|
| 4 | 2.810 |
| 15 | 2.700 |
| 30 | 2.643 |
| 45 | 2.655 |

The voltage was observed to be stable at the 45 minute measurement.

EXAMPLE IV

A quantity of 20 ml. of bromine was placed in a beaker, pyrrole was titrated into the beaker from a buret, and impedance was measured as a function of pyrrole concentration. The results are summarized in the following table:

Table III

| Pyrrole concentration ml. | Impedance ohms |
|---|---|
| 0 | infinite |
| 1 | 12,000 |
| 2.5 | 11,000 |
| 3.5 | 6,600 |
| ~6 | 5,400 |

The observed reaction was violent and exothermic, a green vapor poured out of the beaker, and a sticky messy compound was formed which was black in color and viscous. The reaction continued to be violent even after this initial reaction. Any additional pyrrole immediately caused smoke, heat, and formation of more sticky substance. Next, a lithium anode element and a molybdenum cathode current collector were placed in the beaker, and measurements were taken according to the procedures followed in the foregoing examples. The open circuit voltage was 3.45 volts and the impedance was 1800 ohms. With a 100 kilohm resistor connected across the electrodes the cell voltage was 3.18 volts. After one hour, the open circuit voltage stabilized to 3.07 volts and the impedance to 1300 ohms.

EXAMPLE V

A quantity of 20 ml. of pyrrole was placed in a beaker, and chlorine gas was passed into the liquid through a ballast bottle from a tank of chlorine gas. The observed reaction was immediate and violent, extremely exothermic with vapor being evolved. The amount of chlorine introduced was unknown. Impedance measurements were taken as summarized in the following table:

Table IV

| Elapsed Time | Impedance |
|---|---|
| 5 seconds | 117 ohms |
| ~1 minute | 1800 ohms |
| ~2 minutes | 1350 ohms |

When a lithium anode element and a molybdenum cathode electrode were inserted into the gunky substance in the beaker and connected to a meter according to the procedure of the foregoing examples, an open circuit voltage of 2.6 volts was read. When a 100 kilohm load was connected across the electrodes, the voltage reading was 2.57 volts. The open circuit voltage stabilized at 2.781 volts after one hour.

It is therefore apparent that the present invention accomplishes its intended objects. While several embodiments of the present invention have been described in detail, this is for the purpose of illustration, not limitation.

We claim:

1. A lithium-halogen cell comprising an anode comprising solid lithium, a solid electrolyte comprising lithium halide, and a cathode comprising a charge transfer complex of a monomer and a halogen, said monomer comprising an aromatic tertiary amine which forms a complex with said halogen.

2. A cell according to claim 1, wherein said halogen is iodine.

3. A cell according to claim 2, wherein said monomer is pyrrole.

4. A cell according to claim 1, wherein said halogen is bromine.

5. A cell according to claim 4, wherein said monomer is pyrrole.

6. A cell according to claim 1, wherein said halogen is chlorine.

7. A cell according to claim 6, wherein said monomer is pyrrole.

8. A cell according to claim 1, wherein said lithium anode has a surface operatively contacting said cathode and further including a coating on said surface of an organic electron donor material.

9. A cell according to claim 8, wherein said organic electron donor material is polyvinyl pyridine.

10. A cell according to claim 1, wherein said monomer is selected from the group consisting of picoline, pyridine, indole, pyrrole and quinoline.

* * * * *